No. 881,472. PATENTED MAR. 10, 1908.
C. P. HOLLISTER.
POWER TRANSMISSION DEVICE.
APPLICATION FILED OCT. 4, 1907.
2 SHEETS—SHEET 1.
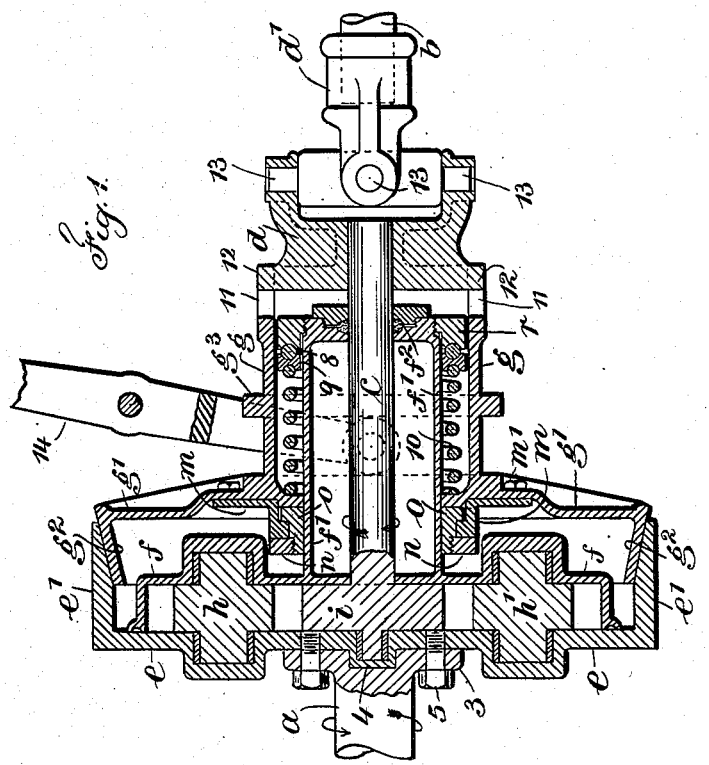
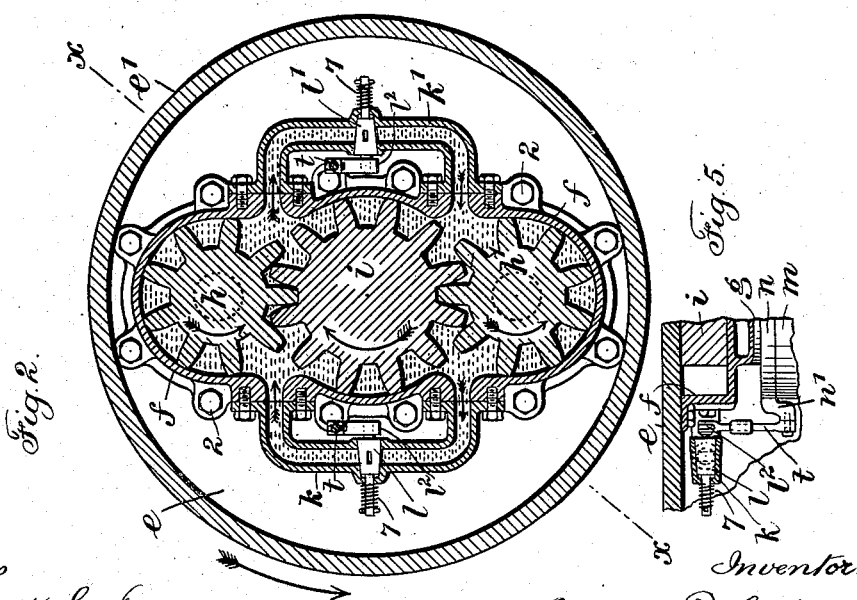
Witnesses
Inventor.
Clarence P. Hollister
by Harold Serrell
his atty.

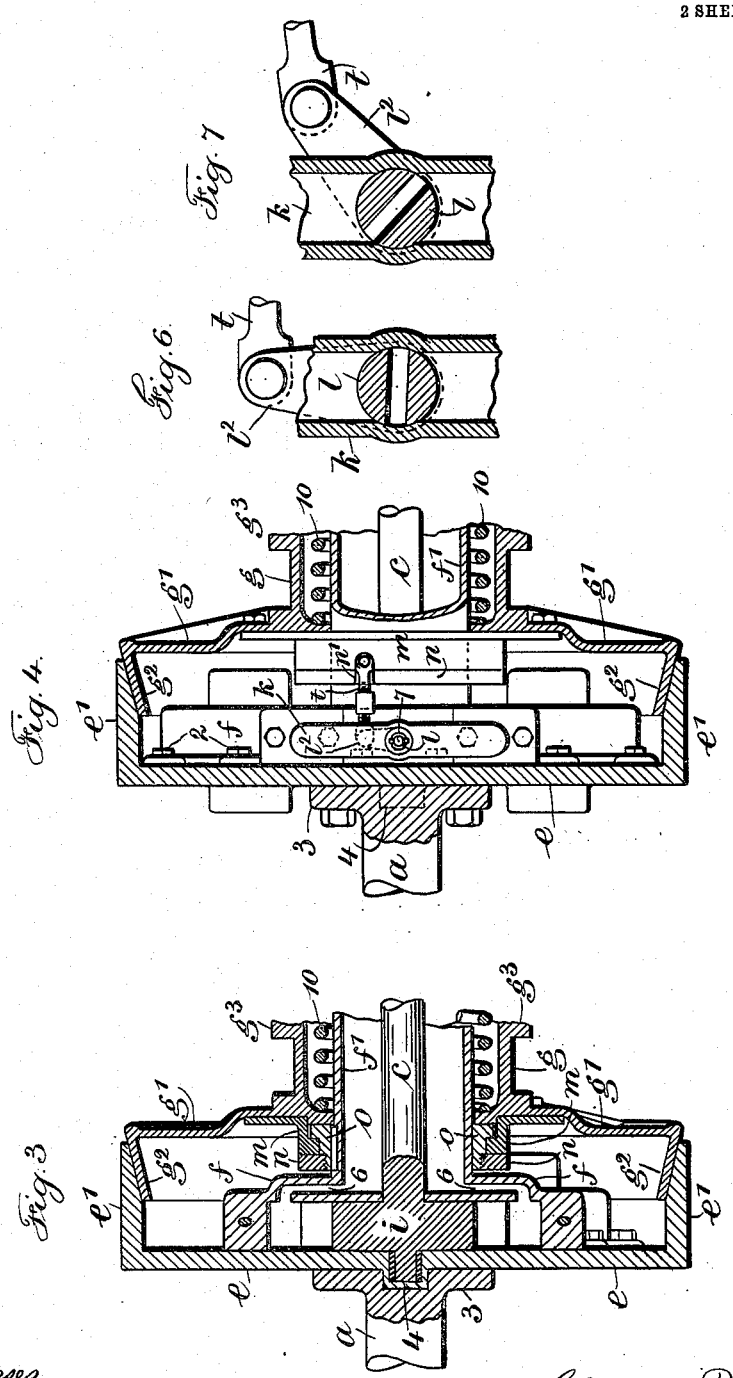

UNITED STATES PATENT OFFICE.

CLARENCE P. HOLLISTER, OF PITTSFIELD, MASSACHUSETTS, ASSIGNOR OF ONE-HALF TO HIMSELF AND ONE-HALF TO HERBERT M. STILSON, OF PITTSFIELD, MASSACHUSETTS.

POWER-TRANSMISSION DEVICE.

No. 881,472.　　　Specification of Letters Patent.　　Patented March 10, 1908.

Application filed October 4, 1907. Serial No. 395,843.

*To all whom it may concern:*

Be it known that I, CLARENCE P. HOLLISTER, a citizen of the United States, residing at Pittsfield, in the county of Berkshire and State of Massachusetts, have invented an Improvement in Power-Transmission Devices, of which the following is a specification.

My invention relates to a power transmission device of general utility and especially applicable in connection with automobiles and motor boats, and the object of my invention is the production of a transmission device of simple construction and noiseless character and one free from the risks of injury and expensive repairs attendant upon the usual differential gears.

In the device of my invention I provide a set or train of gears connected respectively to the engine for power and to the running gear of the car or other device for transmission, and said gears are located in a case fluid-filled and tight, and means are provided for regulating and controlling the movement of the fluid through the case or for impounding the same to the desired extent and so controlling the power delivered by the engine and also the speed of the driven member.

The gears in parts thereof fit the case substantially fluid-tight so that their rotation causes the fluid such as oil, to move between the teeth of the gears and flow through channels of the case provided therefor, and in which channels are valves for closing off more or less the flow of the fluid.

The parts are so constructed and arranged that when the valves are fully opened the fluid flows freely through the case and in this condition the engine of the motor vehicle may still be running and the vehicle be at rest, with the case which is secured to the power shaft and the two smaller gears of the transmission turning about the main gear of the shaft and devices extending to actuate the running gear of the vehicle, and in which position a friction clutch provided is out of engagement.

To start the vehicle and couple up the parts for transmission, the valves are slightly closed to preferably impound and arrest the flow of fluid. This retards and impedes the action of the gears so that the larger of the transmission gears turns perceptibly instead of being at rest, and in this position the vehicle will move forward at a slow rate. A further closing of the valves increases this condition, lessens the rotation of the parts, causing them to move together more uniformly and increases the speed and brings the parts of the friction clutch nearer together. The entire closing of the valves impounds the oil or fluid, and prevents the rotation of the gears, thus causing all the parts to turn as one and at the same time brings the friction clutch into close and driving contact, the power from the power shaft then being transmitted at full speed without any necessary dependence upon the gears.

In the drawing, Figure 1 is a longitudinal section through the devices of my improvement. Fig. 2 is an elevation of the main case member and central transverse section through the gears, valves and the circulating passageways for the fluid. Fig. 3 is a longitudinal section at the dotted line $x, x$, of Fig. 2, and partial elevation of a portion of the structure shown in Fig. 1 and at right angles thereto. Fig. 4 is a longitudinal section and partial plan showing particularly the valve operating mechanism. Fig. 5 is a section and plan showing the valve operating mechanism at right angles to the position shown in Fig. 4, and Figs. 6 and 7 are sections and partial elevations in large size of the valve mechanism in its two extreme positions.

$a$ represents the power shaft, that is, the shaft extending from the engine or other motor. $b$ is the transmission shaft and $c$ an auxiliary transmission shaft. $d$ $d^1$ are members of a universal joint connected by the pivot pins 13; the member $d$ being secured to the auxiliary transmission shaft $c$ and the member $d^1$ to the transmission shaft $b$. $e$ is the main case member and $f$ the auxiliary case member; the parts which are connected together by the connecting bolts 2 passing through lugs of the auxiliary case member into the main case member.

The main case member is provided with a flange $e^1$ beveled on the inner surface toward the edge.

The auxiliary case member is provided with a tubular member $f^1$ which surrounds in part the auxiliary transmission shaft $c$, there being a packing gland $f^2$ at the outer end of the tubular member $f^1$ where the same closes in around the shaft $c$.

I provide a tubular case $g$ surrounding the tubular member $f^1$ and spaced apart therefrom. This tubular case has a disk part $g^1$ at right angles thereto, the part $g^1$ having a flange $g^2$ of tapering character adapted to fit within the flange $e^1$ of the main case member e; said parts forming a clutch. The tubular case $g$ is formed with an annular flange $g^3$ between which and the base of the disk $g^1$ is an annular groove to receive engaging devices of an actuating lever 14 by means of which a longitudinal movement is imparted to the tubular case $g$, its disk $g^1$ and the flange $g^2$.

Between the outer end of the tubular case $g$ and the member $d$ of the universal joint, I provide clutch members 11 and 12 by means of which the said parts are connected and compelled to turn together. Between the main case member $e$ and the auxiliary case member $f$ are the small gears $h$ $h^1$ and the main gear $i$. These small gears are provided with trunnions received in babbitted bearings of the case members $ef$ and the main gear $i$ is in the end of the auxiliary transmission shaft $c$ opposite to the end to which the universal joint member is secured. Suitable bearings are provided therefor.

Parts of the gears $h$ $h^1$ and $i$ fit snugly between parts of the case members $ef$. This will be apparent from reference especially to Fig. 2 in which the outer half circumference of the gears $h$ $h^1$ come closely adjacent to the inner surfaces of the case members while the opposite sides of the central or main gear $i$ have about one quarter of the circumference of said gear at each side, where the teeth thereof come closely adjacent to the surface of the cases, and from Fig. 1 it will be apparent that the inner surfaces of the cases lie closely adjacent to the opposite edges or faces of these gears, consequently between these respective parts there is substantially no space whatsoever. Within these case members $ef$ and within the tubular member $f^1$ is a body of fluid such as oil, which may circulate through passageways provided therefor and hereinafter described.

The power shaft $a$ is provided with a flange 3 and by preference a central recess receiving a central projection 4 of the case $e$, the parts being firmly connected by bolts 5 so that the power and rotation of the shaft $a$ is communicated to the cases $e$ $f$ and from these cases to the gears $h$ $h^1$ and from the gears $h$ $h^1$ may be communicated to the gear $i$ or from the cases $ef$ and the flange $e^1$ the power and rotation may be communicated through the flange $g^2$, the disk $g^1$, tubular case $g$, clutch members 11 and 12 and the universal joint members $d$ $d^1$ to the transmission shaft $b$.

Fig. 3 shows ducts 6 communicating with the chamber between the case members $e$ $f$ and with the chamber within the member $f^1$ for the circulation of fluid or oil.

I provide pipes $k$ $k^1$,—see particularly Fig. 2, which at one end open into the chamber of the case members $ef$ between the gears $h$ and $i$, and at the other ends open into the chamber between these case members and between the gears $i$ and $h^1$ and at the central portion of these pipes $k$ $k^1$ I have placed the valves $l$ $l^1$ which are of tapering character in seats formed in said pipes $k$ $k^1$, with small perforations for the passage therethrough of the fluid or oil, with helical springs 7 around the valve stems, the function of which is to hold the valves snugly to their seats.

Between the case member $f$ and the disk $g^1$ of the tubular case $g$, I provide an annulus member $m$ flanged and provided with a shoulder. By the flange of this member $m$ the same is secured by bolts $m^1$ to the disk $g^1$ and a ring $o$ surrounding the tubular member $f^1$ is provided with a shoulder coming against the shoulder of the annulus member $m$, with the other portion of said ring $o$ screw-threaded to receive upon it the ring $n$ between which and the shoulder of the ring $o$ is located the annulus member $m$. From this description and illustration, it will appear that the member $m$ is moved longitudinally of the axial center of the structure by virtue of its connection with the tubular case $g$ and that the same in turn moves the rings $o$ and $n$ along over the surface of the tubular member $f^1$ and that these members are moved by the lever device 14 which is manually actuated in connection with the operations of the transmission device.

From Fig. 1 it will also be apparent that the disk $g^1$ has an internal flange which closely surrounds the tubular member $f^1$ and which also comes outside of the ring $o$. I provide a ring $r$ internally threaded to screw upon the outer end of the tubular member $f^1$ outside of the packing gland $f^2$. Between this ring $r$ and a ball-bearing ring 9 are placed a row of anti-friction balls 8 and between the ring 9 and the inner flanged portion of the disk $g$ is placed a helical spring 10, the function of which is to move the tubular case $g$, its disk $g^1$ and all the parts described as connected thereto, so as to bring the flange $g^2$ into contact with the flange $e^1$ I provide an arm $n^1$ secured to the ring $n$ and projecting radially therefrom, and on the valves $l$ $l^1$ I provide crank arms $l^2$ placed at right angles thereto and between the ends of the crank arms $l^2$ and the ends of the arms $n^1$ I provide adjustable rods $t$. With the longitudinal movement of the tubular case $g$ by the manually actuated lever 14 the ring $n$ is moved and the movement imparted thereto drawing upon the arms $n^1$ and adjustable rod $t$, swing the crank arms $l^2$ and turn the valves $l$ $l^1$ from the position Fig. 6 to the position Fig. 7, or vice versa, either to the full extent or to any partial extent so as to close or more or less open these valves $l$.

The arrows in Fig. 2 indicate as an illustration the direction of rotation first of the main case member $e$ and therefore of the auxiliary case member $f$, also the direction of rotation of the small gears $h$ $h^1$ with the said case members and the opposite direction of rotation of the main gear $i$, consequently the direction of rotation of these gears with the chambers between the cases $e f$ and within the case $f^1$ filled with oil, will cause a circulation of the oil through the pipes $k$ $k^1$ in the direction of the arrows Fig. 4.

The operation of this device is based on the circulatory movement of this oil or the impounding of the oil by virtue of its reduced circulation or lack of circulation, for when the valves $l$ $l^1$ are fully opened as shown in Fig. 7, the circulation of the oil as shown in Fig. 2 will pass across between the gears $h$ and $i$ from the left to the right hand and across between the gears $h$ and $i^1$ from the right to the left hand when the valves are fully opened, with the power shaft $a$ and the case members $e$ $f$ turning therewith, the gears $h$ $h^1$ simply rotating around the gear $i$ which is at a state of rest, consequently its shaft $c$, the universal joint members $d$ $d^1$ and the transmission shaft $b$ are also at a state of rest, for the openings in the valves $l$ $l^1$ are presumed to be equal in capacity to the capacity of pipes $k$ $k^1$ and in this position with an automobile, the car will be at rest and the engine running slowly.

The device of my invention is adapted to take the place of the usual differential gears employed with these devices, which must be changed by throwing out certain gears and throwing in other gears for the change of speed, and in which it very frequently happens the teeth are ripped off the gears.

While the car is at rest, the tubular case $g$, its disk $q^1$ and flange $q^2$ are moved away from the full line position Fig. 1 to an extreme position at the right of Fig. 1, limited by the length of the clutch members 11 and 12 and in which position the clutch produced by the flange $e^1$ and the flange $q^2$ are separated. In this position and by virtue of the position of the tubular case $q^1$ the valves have been opened wide into the position Fig. 7, so that the oil may freely circulate within the cases.

When it is desired to start the car or article to be driven from its state of rest, the manually operated lever 14 is moved slightly so as to shift the tubular case $g$ towards the gears and towards the full line position Fig. 1. This movement will slightly close the valves $l$ $l^1$ and impede the circulation of the oil and this will cause in a measure the impounding of the oil which will prevent the freedom of the gears and will thus cause the gear $i$, its shaft $c$ and the parts connected therewith to turn to a slight extent with the power shaft, the cases and the gears $h$ $h^1$ and start up the machine. A further closing of the valves will cause a further impounding of the oil and increase the movement of the vehicle; the tubular case $g$ meanwhile coming nearer to its full line position Fig. 1, and a full closing of the valves by the further movement of the manually operated lever 14 bringing the tubular case $g$ and its parts into the full line position Fig. 1, will not only completely close off the circulation of the oil and impede the same so as to compel the parts to turn together, but will also bring the friction surfaces of the flanges $e^1$ and $q^2$ into contact for a driving transmission. It will thus be seen that from an easy start of the vehicle up to full speed is controlled entirely by the one lever and by the positions of the two valves controlling the circulation of the fluid or oil, and it will also be apparent that for the reverse action a complete movement of the lever will open the valves fully, restore the circulation and free the running gear of the car from connection with the power shaft so that the car may either coast freely or come to a quick stop upon the application of the brakes.

I claim as my invention:—

1. In a power transmission device and in combination, a case fluid-filled and tight, a set of gears located in said case and connected respectively to the engine for power and to the running gear of the car or vehicle for transmission, means providing for and for regulating and controlling the movement of the fluid through the case or impounding the same and so controlling the power delivered by the engine to and also the speed of the driven member, and parts providing for a frictional engagement or grip.

2. In a power transmission device and in combination, a case fluid-filled and tight, a set of gears located in said case and connected respectively to the engine for power and to the running gear of the car or vehicle for transmission, pipes connecting the respective opposite portions of said case and providing for the circulation of the fluid through the case, valves in said pipes for regulating and controlling the movement of the fluid and impounding the same and so controlling the power delivered from the engine to and also the speed of the driven member, and parts providing for a frictional engagement or grip.

3. In a power transmission device and in combination, a case fluid-filled and tight, a set of gears located in said case and connected respectively to the engine for power and to the running gear of the car or vehicle, for transmission, pipes connecting the respective opposite portions of said case and providing for the circulation of the fluid through the case, valves in said pipes for regulating and controlling the movement of the fluid and impounding the same and so controlling the power delivered from the engine to and also the speed of the driven member, a manually actuated lever, a slidable member, connections therefrom to said valves for their operation, and parts providing for a frictional engagement or grip.

4. In a power transmission device, the combination with a set of three gears in line, of the case members $ef$, fluid-filled and tight, pipes $k\ k^1$ connecting parts of the case at opposite sides, valves intermediately placed in said pipes and provided with apertures which in area agree with the area of said pipes for the free passage of the fluid when the valves are open, a tubular member $f^1$ formed with the case member $f$, a tubular case $g$ slidable thereon manually actuated and normally spring returned, a ring member $n$ connected with the slidable case $g$, arms formed on said ring member and crank-arms formed with said valves and rods extending between said arms and said crank-arms for opening and closing said valves with and by the longitudinal movement of the case $g$ as manually operated.

5. In a power transmission device, the combination with a set of three gears in line, of the case members $ef$, fluid-filled and tight, pipes $k\ k^1$ connecting parts of the case at opposite sides, valves intermediately placed in said pipes and provided with apertures which in area agree with the area of said pipes for the free passage of the fluid when the valves are open, a manually actuated slidable case and friction grip device, a ring member movable therewith, crank arms connected to the valves, arms upon said ring member and adjustable rods extending between and respectively connected to the said crank arms and arms of the ring.

6. In a power transmission device, the combination with a set of three gears in line, of the case members $ef$, fluid-filled and tight, pipes $k\ k^1$ connecting parts of the case at opposite sides, valves intermediately placed in said pipes and provided with apertures which in area agree with the area of said pipes for the free passage of the fluid when the valves are open, means manually actuated for opening and closing the valves, a tubular member $f^1$ formed with the case member $f$, ports connecting these parts for the free passage of fluid or oil, an auxiliary shaft connected to the central gear and passing through the tubular member $f^1$ and a packing gland at the outer end of the said member $f^1$.

Signed by me this 27th day of September, 1907.

CLARENCE P. HOLLISTER.

Witnesses:
 FRED H. ASHMAN,
 ROBERT A. BARBOUR.